(No Model.)
W. S. BEEBE.
CHIMNEY COWL.
No. 267,479.                   Patented Nov. 14, 1882.
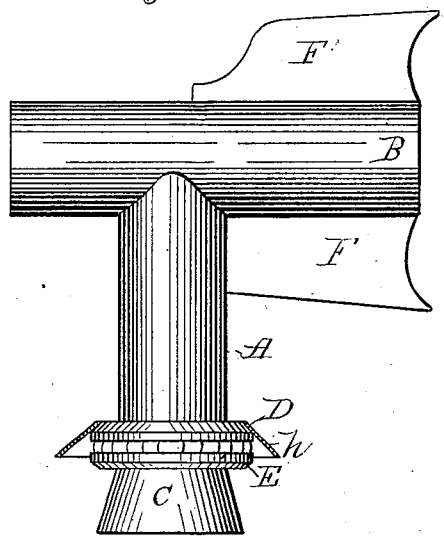
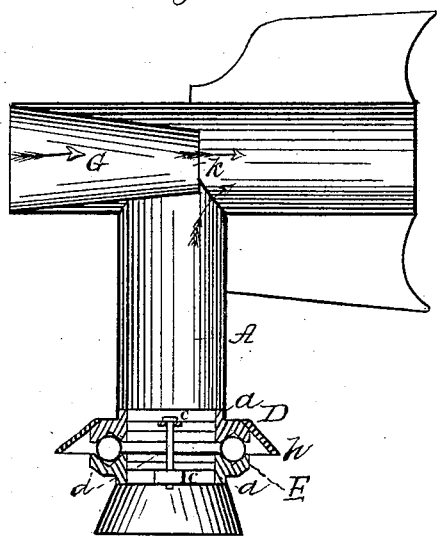
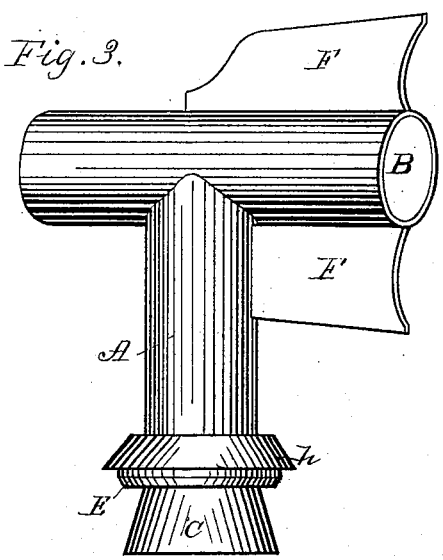
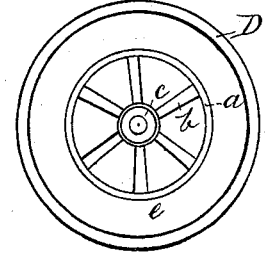
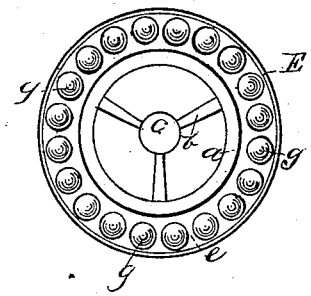
WITNESSES
Amelia L. Keyser
Philip C. Masi.
INVENTOR
W. S. Beebe
by Anderson Smith
his ATTORNEYS

UNITED STATES PATENT OFFICE.

WINFIELD S. BEEBE, OF MIDDLETOWN, CONNECTICUT.

CHIMNEY-COWL.

SPECIFICATION forming part of Letters Patent No. 267,479, dated November 14, 1882.

Application filed July 18, 1882. (No model.)

*To all whom it may concern:*

Be it known that I, WINFIELD S. BEEBE, a citizen of the United States, and a resident of Middletown, in the county of Middlesex and State of Connecticut, have invented a new and valuable Improvement in Chimney-Cowls; and I do hereby declare that the following is a full, clear, and exact description of the construction and operation of the same, reference being had to the annexed drawings, making a part of this specification, and to the letters and figures of reference marked thereon.

Figure 1 of the drawings is a side view, part sectional, of my device. Fig. 2 is a vertical sectional view of the same. Fig. 3 is also a side view, and Figs. 4 and 5 are detail views.

This invention has relation to chimney-cowls; and it consists in the novel construction and arrangement of parts, as will be hereinafter more fully described and claimed.

In the accompanying drawings, the letter A designates the upright pipe, and B its transverse pipe-section, open at each end, and having a middle opening in its under part, whereby it communicates with the upright pipe A, to the upper end of which it is attached.

C represents a lower pipe-section or tubular base in line with the stem-pipe A.

D and E indicate the upper and lower annular spider-bearings, each of which is formed with a circular flange or bearing, $a$, around its interior margin, designed to afford a connection to the stem-pipe A of the cowl, and to the lower section or tubular base, C, which is in line therewith. These annular bearings have interior radial arms, $b$, whereby they are connected to central hubs, $c$, and said hubs are connected by a vertical pivot-bolt $d$. The inner opposed faces of the bearings D and E are circularly grooved, as indicated at $e$, to form bearings for a series of anti-friction balls $g$, which are designed to work between the annular bearings, the upper bearing, D, moving on these balls, which in turn move on the lower bearing, E. The grooves $e$ are preferably made with inclined walls joined at a base angle, as indicated in cross-section, in order to reduce the frictional bearing of the balls. Usually the upper annulus, D, is provided with an outwardly and downwardly extending curtain, $h$, serving to protect the bearings and balls from the weather.

F designates the wind flanges or vanes of the cowl, attached to one end of the transverse tubular head B, and serving to turn the cowl on its bearings, so that the other end of said head will always be directed to the wind. From this end extends inward a gradually-tapering or conical guide-wall, G, the axis of which is horizontal. This cone-guide extends inward along the interior of the head B, passing nearly over the upper end or opening of the stem-pipe A, and terminates in an open inner discharging end, $k$, the diameter of which is much less than that of the pipe-section. It is therefore designed to increase the force and rapidity of the wind-current entering at the end of the transverse pipe B, so that its discharge at the small opening $k$ will cause a strong upward draft in the stem-pipe A, and thereby effect a thorough ventilation of the chimney and all apartments communicating therewith.

Having described this invention, what I claim, and desire to secure by Letters Patent, is—

In a chimney-cowl, the combination, with the stem-pipe A, having at its lower end the bearing D and extending curtain $h$, of the base C, having the bearing F and the friction-balls $g$ between said bearings, substantially as specified.

In testimony that I claim the above I have hereunto subscribed my name in the presence of two witnesses.

WINFIELD S. BEEBE.

Witnesses:
GEORGE H. HEDGES,
HIRAM H. BEEBE.